A. SANFORD.
Ox Shoe.

No. 231,105.    Patented Aug. 10, 1880.

Attest,
W. H. Knight
W. Blackstock.

Inventor,
Albert Sanford
By Le. Hill,
His Atty.

UNITED STATES PATENT OFFICE.

ALBERT SANFORD, OF OSHKOSH, WISCONSIN.

OXSHOE.

SPECIFICATION forming part of Letters Patent No. 231,105, dated August 10, 1880.

Application filed November 25, 1879.

*To all whom it may concern:*

Be it known that I, ALBERT SANFORD, of Oshkosh, in the county of Winnebago and State of Wisconsin, have invented a certain new and Improved Oxshoe; and I do hereby declare the following to be a full, clear, and exact description of the same, reference being had to the accompanying drawings, forming part of this specification, in which—

Figure 1:
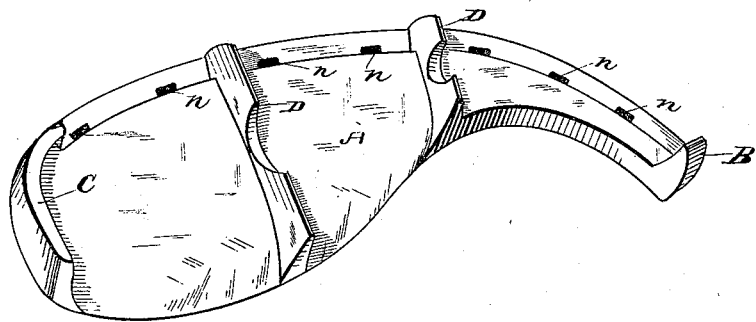
Figure 2:
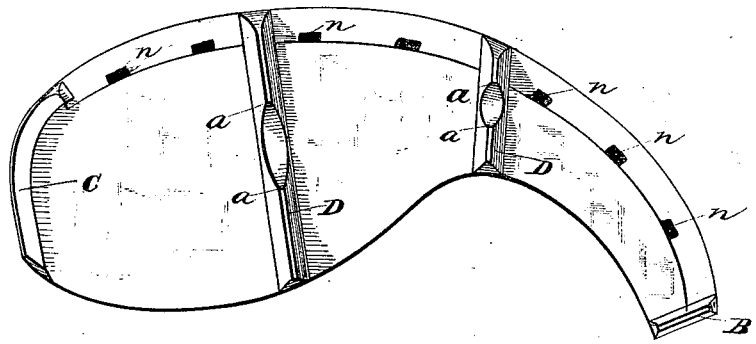

Figure 1 is a perspective view of a shoe constructed in accordance with my invention; Fig. 2, a bottom-plan view of the same, and Fig. 3 a bottom-plan view of a modified form.

Similar letters of reference in the several figures denote the same parts.

The object of my invention is to provide improved shoes for draft-oxen combining strength and durability with lightness, and adapted to prevent slipping and turning of the animal's feet to which they are applied.

To this end my invention consists, primarily, of an oxshoe provided with toe and heel calks and one or more intermediate calks extending across the body of the shoe, for the purpose of affording an even bearing and support for the animal's hoof and to prevent spreading of the same.

It further consists in notching or corrugating the intermediate calks, so as to present a series of sharp corners, to prevent the lateral slipping of the shoe; and it consists, finally, in a shoe, as a whole, constructed as I will now proceed to describe.

Figure 3:
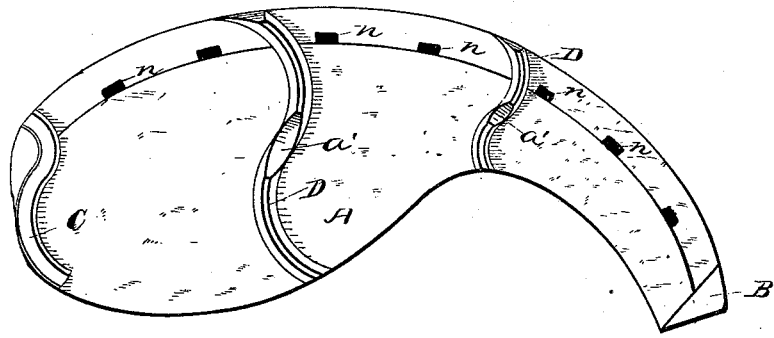

In the accompanying drawings, A represents the body of the shoe, constructed of the general form shown, having the usual toe-calk B and heel-calk C, and provided with a series of nail-holes, *n*, along its outer edge. Intermediate between the toe and heel calks are arranged one or more additional calks, D, extending across the body of the shoe from side to side, substantially at right angles to the line of draft, as shown in Figs. 1 and 2, or in curved lines, as shown in Fig. 3, or in any other suitable manner, it only being necessary that the said calks extend from side to side of the shoe to present a uniform bearing for the animal's hoof and prevent the same from turning or spreading.

In the use of those oxshoes which are unprovided with intermediate calks the tendency is to permit the outside of each half of the animal's hoof to roll down, and thus cause the hoof to spread, while in those shoes in which an intermediate calk is employed on the outside edge of the shoe parallel with the line of draft the tendency is just the opposite and equally objectionable. Moreover, in the use of the latter class of shoes, when the animal steps on a stone or stick and engages the intermediate calk only, the wrench on the foot is greater than where no intermediate calk at all is used.

Oxen are generally used where roads are rough, stony, and full of roots, they being the pioneers of the horse. Corduroy roads and bridges are common, and the poles of which they are composed are always at right angles to the line of draft. My improved shoe, with its intermediate calks arranged so as to extend way across the body, affords a sure and safe footing for the animal, as some of the calks always take hold, and if one of them strikes upon a skid, pole, or root the foot is not canted sidewise to right or left, but tips forward or backward in a natural way.

In order to prevent side slipping, especially on hard and icy surfaces, I preferably corrugate the calks, as shown, so as to present a number of sharp corners, $a\ a$. A series of independent calks arranged in line across the shoe would answer the same purpose.

In the modification shown in Fig. 3 the intermediate calks, and also the heel-calk, extend across the shoe in a double curved line, and are cut away at the middle, as shown at $a'\ a'$. This construction has the advantage of counteracting the side-slipping tendency, and, by affording an increased bearing-surface, secures a better hold on the ground or ice.

The shoes may be constructed of wrought-iron, malleable iron, or cast-steel, as desired.

I claim as new and desire to secure by Letters Patent—

1. An oxshoe provided with toe and heel calks, and having one or more intermediate calks extending laterally across its body, substantially as described.

2. An oxshoe provided with toe and heel calks, and having one or more intermediate notched or corrugated calks extending laterally across its body, substantially as described, for the purpose specified.

3. The shoe A, having the toe and heel calks B and C and the notched intermediate calks, D, arranged substantially at right angles to the line of draft, substantially as described, for the purpose specified.

ALBERT SANFORD.

Witnesses:
H. D. HARSHAW,
E. C. PORS.